United States Patent [19]

Belart et al.

[11] 4,305,624
[45] Dec. 15, 1981

[54] HYDRAULIC BRAKE ACTUATION DEVICE FOR MOTOR VEHICLES EQUIPPED WITH AN ANTISKID SYSTEM

[75] Inventors: Juan Belart, Walldorf; Jochen Burgdorf, Offenbach-Rumpenheim, both of Fed. Rep. of Germany

[73] Assignee: ITT Industries, Inc., New York, N.Y.

[21] Appl. No.: 122,095

[22] Filed: Feb. 19, 1980

[30] Foreign Application Priority Data

Mar. 5, 1979 [DE] Fed. Rep. of Germany ....... 2908480

[51] Int. Cl.³ ............................................. B60T 17/18
[52] U.S. Cl. ..................................... 303/92; 303/116
[58] Field of Search ................... 303/6 R, 10, 52, 92, 303/114, 116; 188/181 A

[56] References Cited

U.S. PATENT DOCUMENTS

| | | | |
|---|---|---|---|
| 3,756,666 | 9/1973 | Leiber | 303/116 X |
| 3,905,654 | 9/1975 | Tribe | 303/92 X |
| 3,910,645 | 10/1975 | Takeuchi et al. | 303/92 X |
| 4,111,496 | 9/1978 | Leiber | 303/92 |

*Primary Examiner*—Duane A. Reger
*Attorney, Agent, or Firm*—John T. O'Halloran; Alfred C. Hill

[57] ABSTRACT

A multiple circuit master cylinder comprising a plurality of master cylinders arranged in tandem with the pressure in each individual master cylinder being hydraulically controlled independently of the pressure in the other master cylinders. The master cylinder piston of each master cylinder has an extension thereon which is guided in a sealed manner through a transverse housing wall to be close to the piston of the adjacent master cylinder such that should the hydraulic energy fail, all master cylinders are mechanically operated by the brake pedal.

13 Claims, 3 Drawing Figures

HYDRAULIC BRAKE ACTUATION DEVICE FOR MOTOR VEHICLES EQUIPPED WITH AN ANTISKID SYSTEM

BACKGROUND OF THE INVENTION

The present invention relates to a hydraulic brake actuation device for motor vehicles equipped with an antiskid system which includes a continuous-delivery pressure medium source supplying a first pressure medium circuit, influenceable by a pedal-operated control device, and of a first master cylinder which, via a valve arrangement, is connected to the first pressure medium circuit and to a first brake circuit which is independent of the first pressure medium circuit, the master cylinder's piston being operable by the pressure in the first pressure medium circuit and/or by the brake pedal.

Such a hydraulic brake actuation device has come to knowledge in the German Pat. No. DE-AS 20 17 185. It includes a housing for the accomodation of the control device and of a master brake cylinder connected to the housing. A piston divides the control device into two pressure chambers, a third chamber being defined by a recess around the circumference of the piston. The first pressure chamber supplied by the pressure medium source serves an an inlet chamber and is penetrated by a pedal-operated valve tappet opposite which a bore is coaxially arranged in the piston, said bore connecting the inlet chamber with the third chamber, which is the outlet chamber. The second chamber communicates with the compensation reservoir and is filled with pressure medium, only. It is penetrated by a tappet which is sealingly led from the control housing into the master brake cylinder and which thus mechanically connects the piston with the master brake cylinder piston. The master brake cylinder's pressure chamber penetrated by the tappet communicates with the inlet chamber of the control housing by means of a valve arrangement. The brake circuit pertaining to the master brake cylinder communicates with the wheel brake cylinders of the front axle. The pressure medium source constantly delivers to the inlet chamber and, through the bore in the piston into the outlet chamber, back into the storage tank which simultaneously serves as compensation reservoir. If, due to the actuation of the pedal, the valve tappet tries to close the bore in the piston, in the inlet chamber a pressure will build up which, via the valve arrangement, will act on the master brake cylinder piston and displace the latter, thus building up a pressure in the brake circuit of the master brake cylinder. A valve arrangement directly connects the rear axle with the pressure medium circuit. Thus, it is safeguarded that the braking pressure will be controllable in the brake circuit of the front axle without any fluid losses. With respect to antiskid systems, however, it has proved disadvantageous that this system will allow a joint control of the front wheels, only. In order to achieve an optimum short braking distance as well as to safeguard the steerability of the vehicle what is aimed at is a serarate control of the front wheels.

SUMMARY OF THE INVENTION

It is an object of the present invention to provide a hydraulic brake actuation device having two brake circuits which will separately be operable by a pressure medium circuit, which will ensure independent control with respect to each other, and which both will be operable by the brake pedal if the pressure medium circuit fails.

A feature of the present invention is the provision of a hydraulic brake actuation device for motor vehicles equipped with an antiskid system comprising at least: a continuous-delivery pressure medium source; a pressure medium circuit controllably connected to the source by a pedal-operated control device; a first master cylinder connected to a first brake circuit and the pressure medium circuit by a first antiskid valve arrangement, the first brake circuit being independent of the pressure medium circuit, a first master cylinder piston disposed in the first master cylinder being operable by at least one of the pressure in the pressure medium circuit and a brake pedal; and a second master cylinder connected to the first master cylinder the second master being connected to a second brake circuit and the pressure medium circuit by a second antiskid valve arrangement, the second brake circuit being independent of the pressure medium circuit, a second master cylinder piston disposed in the second master cylinder, being operable by the pressure in the pressure medium circuit and, in case of disturbances in the pressure medium circuit, by the pressure in the first brake circuit by way of a mechanical means.

Thus, a controllable hydraulic unit has been provided for an antiskid system which even in an emergency will enable a safe braking action.

Since the control device as well as the pistons of the first and second master cylinders are coaxially arranged behind each other a tandem master cylinder is provided in which both brake circuits, which are independent of the pressure medium circuit, allow independent control with respect to each other without any braking fluid being used.

In a further embodiment due to the fact that the mechanical means is also mechanically operable by the first piston of the first master cylinder a higher degree of operational reliability is achieved. Even if the pressure medium circuit and one of the brake circuits fail it will be possible to brake one front wheel if an emergency braking has to be performed.

An advantageous embodiment includes the mechanical means in the form of a stepped piston which slides in a pressure chamber interconnected between the first and second master cylinders, which will project into the pressure chamber of the second master cylinder by means of its smaller diameter portion, and which will form the bottom of the pressure chamber of the first brake circuit by means of the bigger piston portion, the larger effective surface which is spaced from the pressure chamber being acted upon by the pressure of the pressure medium circuit and keeping the stepped piston against a shoulder of the first master cylinder's housing which is designed as an abutment. As long as the brake is intact, upon a normal braking action as well as in the event of control of the antiskid device, the stepped piston will act as a solid wall of the pressure chamber of the first brake circuit since the pressure of the brake circuit will not be able to displace the stepped piston due to the ratio of surfaces and due to the pressure of the pressure medium circuit acting on the larger effective surface. Upon failure of the pressure medium circuit the stepped piston will act as mechanical and/or hydraulic connection between the pistons of the first and second master cylinders.

An advantageous embodiment of the stepped piston is that it will sealingly slide by means of a portion having a smaller diameter with respect to the larger piston portion in the pressure chamber of the first brake circuit on the side facing the first master cylinder and in that the surface exposed to the pressure medium circuit will at least equal or be larger than the surface acted upon by the pressure of the pressure chamber. Thus, it is safeguarded that the force keeping the stepped piston against the abutment in the housing will always exceed the force of the surface acted upon by the pressure chamber of the brake circuit.

Thanks to the embodiment of the first master cylinder forming a structural unit with the mechanical means it is possible to provide a master cylinder with a plurality of independent brake circuits which will allow separate control and hydraulic or mechanical operation if the pressure medium circuit fails and an emergency braking becomes necessary.

By coupling the stepped piston and the piston of the first master cylinder so that they communicate with each other by means of a backlash coupling, a preloaded spring acting between the pistons, a definite rest position of the pistons is safeguarded for any operational event. Upon the failure of the pressure medium circuit the return spring of the second master brake cylinder will keep the stepped piston and the piston of the first master cylinder in a rest position. As a result a return spring for the stepped piston can be eliminated. Thus, it is possible to reduce the energy absorbed by springs, making it available for the brake circuit.

The connection of one front wheel brake cylinder at a time to the master cylinder of each brake circuit provides an advantageous coordination of the brake circuits. Due to the dynamic load shifting the front wheels will contribute most to the braking action and thus, in the event of an emergency braking the front wheel brake circuits will be available as a result of which the braking distance in this operational event will be kept to a low optimum.

The use of a further master cylinder will enable the brake cylinders of the rear wheels to be separately or jointly connected to a further brake circuit of a hydraulic master brake cylinder which is operable by the pressure medium circuit via a valve arrangement. This arrangement provides an additional degree of operational reliability. By separating the pressure medium circuit and the brake circuit in the event of defective wheel cylinders of the rear wheels or of defective lines leading to the wheel cylinders, the affected brake circuit will be the only one to fail without incurring any reaction on the pressure medium circuit.

BRIEF DESCRIPTION OF THE DRAWING

Above-mentioned and other features and objects of this invention will become more apparent by reference to the following description taken in conjunction with this accompanying drawing, in which.

DESCRIPTION OF THE PREFERRED EMBODIMENTS

Figure 1:
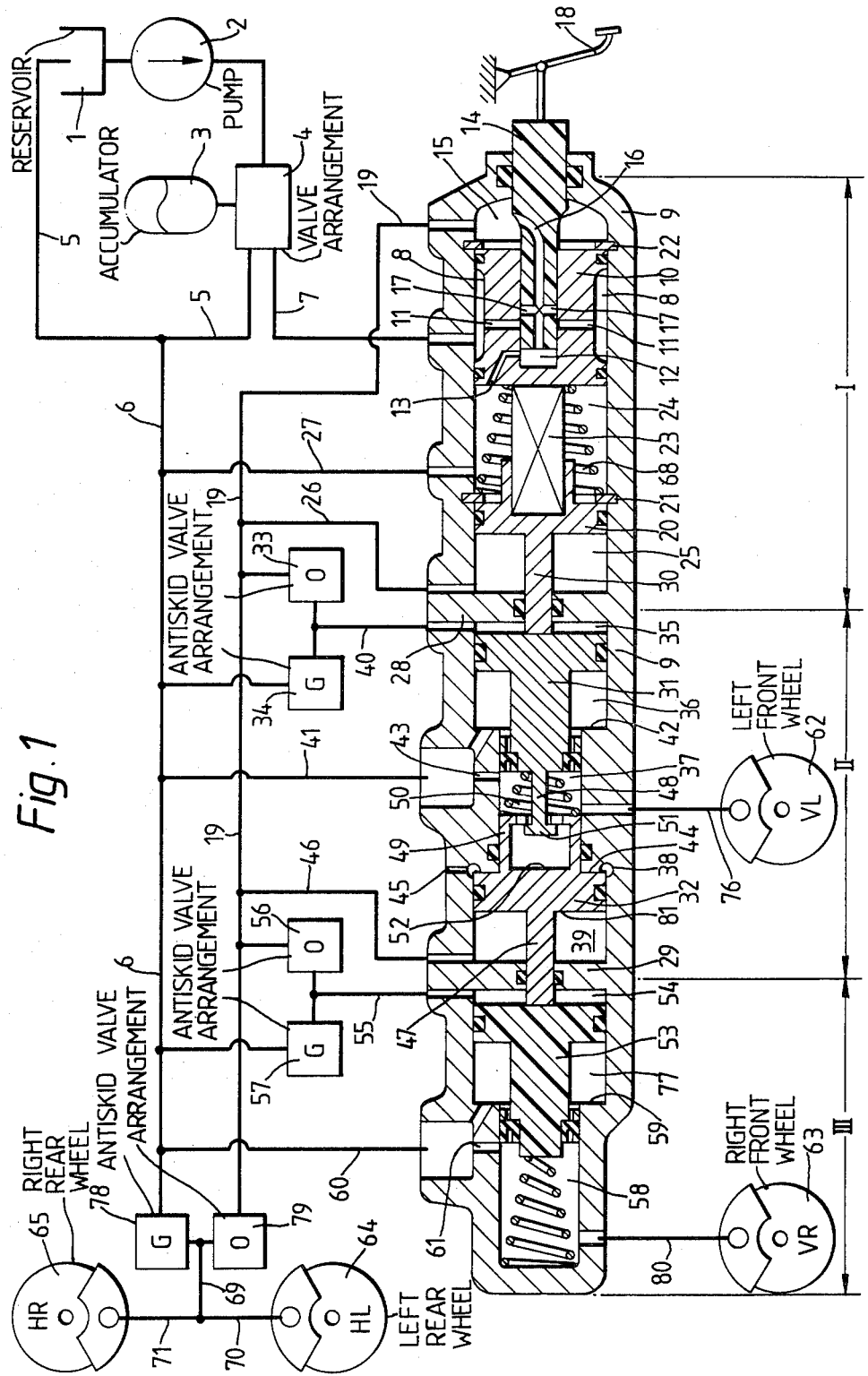
FIG. 1 is a longitudinal cross sectional view of a tandem master cylinder in accordance with the principles of the present invention.

Besides the controllable tandem master cylinder, FIG. 1 also shows the further hydraulic arrangement of the brake system. A pump 2 supplies pressure medium from a storage tank/compensation reservoir 1 via a valve arrangement 4 into the pressure accumulator 3 and into the pressure line 7. After building-up of the operating pressure, the valve arrangement 4 will deliver the excessive pressure medium back into the storage tank via the line 5. The tandem master cylinder 9 is subdivided into three sections I, II, and III by means of partition walls 28 and 29. Section I houses the control device, section II contains the arrangement of a first master brake cylinder, and section III accommodates the arrangement of a second master cylinder. In section I, two pistons 10 and 20 are installed which subdivide the section into three pressure medium chambers 15, 24 and 25. The two pistons 10 and 20 communicate with each other by means of a reaction mechanism 23 and define the pressure compensation chamber 24 lying between them. The pressure compensation chamber 24 communicates with compensation reservoir 1 via the lines 27 and 6. Piston 10 is provided with a groove around its circumference. This groove forms a chamber which serves as inlet chamber 8 between housing 9 and piston 10. Further, piston 10 has radial bores 11 connecting inlet chamber 8 with an axial bore 12 in piston 10. In bore 12, a piston 14 slides which acts as a control slide and which projects from housing 9 in a sealed manner and which is operable via a brake pedal 18. Piston 14 also has radial and axial bores 16 and 17 serving to control the passage of the pressure medium from inlet chamber 8 into outlet chamber 15. Outlet chamber 15 is defined by piston 10 and housing 9 and forms the controlled pressure medium circuit, together with the line 19. Pressure medium chamber 15 communicates with pressure compensation chamber 24 or with compensation reservoir 1, respectively, via bore 16 and a bore 13 which connects bore 12 with pressure compensation chamber 24. An annular stop 22 defines the rest position of piston 10. The rest portion of piston 20 is defined by the annular stop 21. The line 26 connects pressure medium chamber 25 defined by partition wall 28 and piston 20 to line 19 of the controlled pressure medium circuit. Piston 20 has an axially arranged projection 30 which penetrates the partition wall in a sealed manner and ends in the first master brake cylinder.

The first master brake cylinder essentially includes a piston 31 sliding in housing section II and a stepped piston 81. Piston 31 is hydraulically operable by means of a valve arrangement 33 and 34 and stepped piston 81 serves as an emergency piston for the hydraulic or mechanical operation, respectively, of a following master brake cylinder. Pistons 31 and 81 subdivide the stepped housing section II into five chambers three of them being designed as pressure chambers. The chamber 35 defined by piston 31 and partition wall 28 communicates with valve arrangement 33 and 34 via the pressure medium line 40 as a result of which the chamber 35 may alternatively be connected to controlled pressure medium line 19 or to return line 6 and—if necessary—even be shut off from both lines. The chamber 36 defined by piston 31, which features a stepped design, and the shoulder 42 communicates with compensation reservoir 1 via the lines 41 and 6. Between piston 31 and portion 32 of piston 81 there is disposed the pressure chamber 37 of the first brake circuit leading to the left front wheel 62. Pressure chamber 37 communicates with return line 6 via a small opening 43. Consequently any volume loss of brake fluid in the brake circuit 76 may be compensated for. The portion 49 of stepped piston 81 projects in a sealed manner into pressure chamber 37 of the first brake circuit, and at the same time defines the latter. The chamber 38 formed between the shoulder 44 and the piston portion 32 directly communicates with the atmosphere. The chamber 39 which lies between piston portion 32 and partition wall 29 is connected to the controlled pressure medium circuit 19 via the line 46. The stepped piston 81 has a smaller portion 47 passed in a sealed manner through partition wall 29 and ending in the second master brake cylinder. Piston 31 and piston portion 32 are connected with each other by means of a backlash coupling which includes an axial projection 48 extending from piston 31 and the larger designed head 51 which is gripped in a claw-like manner by portion 49 of stepped piston 81. Piston 31 and piston portion 32 are pressed apart by a preloaded spring 50 as a result of which head 51 will rest against portion 49 and both pistons will adopt a definite position with respect to each other in the rest position. Head 51 of projection 48 can be brought into abutment at a supporting surface 52 of piston portion 32 against the force of spring 50. Thus both pistons 31 and 81 are able to mechanically transmit a force applied to piston 31.

The section III of housing 9 contains the second master brake cylinder. The piston 53 having a stepped design together with partition wall 2a defines the hydraulic pressure chamber 54. Chamber 54 is alternatively connectable to the controlled pressure medium circuit 19 or return line 6 via the line 55 and the valve arrangement 56 and 57, and which—if necessary—may be shut off from both lines. The smaller portion of piston 53 slides in the step-like shouldered portion of section III and its front face together with housing 9 defines the pressure chamber 58 of the brake circuit of the right-hand front wheel. The chamber 77 formed between the shoulder 59 of housing 9 and piston 53 is connected with compensation reservoir 1 via lines 60, 6 and 5. Pressure chamber 58 of the second brake circuit 80 also communicates with compensation reservoir 1 via the opening 61. As a consequence any fluid loss in the brake circuit may be compensated for.

Via the valve arrangement 78 and 79, the wheel cylinders of the rear wheels 64 and 65 directly communicate with the controlled pressure medium circuit 19 or with the return line 6, respectively.

The mode of operation of the arrangement of FIG. 1 is as follows. The pressure generated by pump 2 in pressure accumulator 3 is also available in inlet chamber 8 via line 7. In the rest position, piston 14, however, blocks the supply of pressure medium from inlet chamber 8. Via bore 16 in piston 14, bore 12, and bore 13 outlet chamber 15 communicates with pressure compensation chamber 24. Pressure compensation chamber 24 on its part communicates with compensation reservoir 1 via lines 27, 6 and 5. If brake pedal 18 is pressed down, piston 14 will shift with respect to piston 10. Thus, bore 13 is closed while bore 11 is opened. Thus, pressure outlet chamber 1 will be separated from bore 12, while a connection will be established between inlet chamber 8 and outlet chamber 15. The pressure will propagate via the line 19 and the side lines 26 and 46 and will enter pressure chambers 25 and 39. Thus, in section I, piston 20 which guides reaction mechanism 23 will be firmly pressed against annular stop 21. Piston 10 will be held by means of reaction mechanism 23 and a spring 68 supported by the annular stop 21 and will thus, be enabled to shift on its part with respect to control slide 14 dependent on the pressure in outlet chamber 15 in order to safeguard that upon reaching of a pressure coordinated with the position of pedal 18 the pressure medium supply via bore 11 may be turned off again, without, however, bore 13 being opened for pressure compensation. The pressure in pressure medium circuit 19 thus controlled by pedal 18 will propagate via valves 33 and 56 and the pertaining lines 40 and 55 to the respective master brake cylinders. The pressure in pressure chamber 35 of the first master cylinder will displace piston 31 axially, the latter thus closing compensation opening 43 and compressing the pessure medium of brake circuit 76 of left-hand front wheel 62. Despite the higher pressure in the pressure chamber 37 now acting on stepped piston 81 the latter will firmly remain at its abutment 44 in housing 9 due to its being dimensioned so that the pressure of controllable pressure medium circuit 19 which is effective in pressure chamber 39 applies a force to piston portion 32 which exceeds the force of the surface acted upon by the pressure in pressure chamber 37 which is acting on piston portion 32 in the opposite direction. The second master brake cylinder also communicates with the controllable pressure medium circuit 19 via valve 56 and line 55, the pressure which results in pressure chamber 54 axially displacing piston 53 of the second master brake cylinder. Piston 53 will close compensating opening 61 and compress the pressure medium of brake circuit 80 of the right-hand front wheel 63. Rear wheel brakes 64 and 65 directly communicate with controllable pressure medium circuit 19 via valve 79 and the lines 69, 70 and 71. The pressure applied by brake pedal 18 will thus indirectly act on front wheel brakes 62 and 63 via pistons 31 and 53 and yet will directly act on the wheel brake cylinders of rear wheels 64 and 65. The pistons of the master brake cylinder are dimensioned so as to ensure that the pressure at the wheel cylinders of the front wheels will exceed that at the wheel cylinders of the rear wheels. Thus, the danger of overbraking the rear wheels is substantially elimanated.

The valves 33, 34, 56, 57, 78 and 79 are controlled by an antiskid system ensuring that each wheel will render the maximum braking performance. Since the front wheels have a bigger share in a braking action than the rear wheels, the front wheels are individually controllable while the rear wheels are controlled together. The control will be the same for all the brake circuits and will thus be explained, taking the left-hand front wheel 62 as an example, only. If a danger of a lock-up of the front wheel 62 is noted the electronic control device of the antiskid system will realize this at an early stage and start the necessary measures as a result of which valve 33 will be closed and the valve 34 will be opened. Thus, pressure medium may flow back from the pressure chamber 35 and the braking pressure in brake circuit 76 of the left-hand front wheel decreases. If the danger of a lock-up has been overcome valve 34 will be closed and the valve 33 e.g. will be opened in an impulse-like manner until the electronic control device receives notice of a new danger of lock-up. This controlling action will repeat itself until the vehicle comes to a halt. What is of importance in this arrangement is that piston 31 of the first master brake cylinder may be moved independently of the piston 53 of the second master brake cylinder. Thus in the brake circuits 76 and 80 of the first and second master cylinders a different pressure may be built up which will be necessary in order to achieve an optimum braking action.

However, if, due to a disturbance in the pedal-operated control device, there is no pressure acting in the first housing section of the tendem master cylinder 9 it will be possible to mechanically/hydraulically actuate the pistons of the master brake cylinders by means of the brake pedal 18. Piston 31 of the first master brake cylinder directly communicates with the brake pedal 18 in a mechanical manner. Piston 53 of the second master cylinder hydraulically communicates with piston 31 via stepped piston 81 and the pressure medium in the pressure chamber 37. However, upon an additional failure of the brake circuit of the left-hand front wheel 63, piston 31 will be displaced against the force of spring 50 with respect to stepped piston 81 until head 51 of projection 48 abuts front face 52 of piston portion 32. Now piston 53 of the second master cylinder directly communicates with brake pedal 18 in a mechanical manner. Thus, if the pressure medium circuit 19 fails, in normal cases it will be safeguarded that both front wheels of the vehicle will remain capable of braking. In the extreme case, it will even be safeguarded that upon failure of either of the two front wheel brake circuits there will be still one circuit available for an emergency braking.

Figure 2:
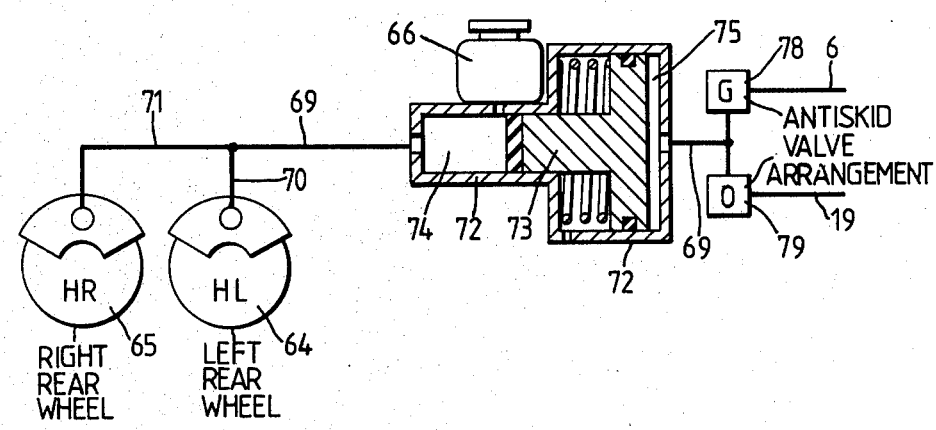
FIG. 2 showing an arrangement for the separation of the rear wheel brake circuit and the pressure medium circuit that may be coupled to the arrangement of FIG. 1.

An advantageous further embodiment of the hydraulic brake actuation device is presented in FIG. 2. For the separation of pressure medium circuit 19 from the brake circuits of all wheels, it is necessary to connect a further hydraulically actuable master brake cylinder 72 between rear wheels 64 and 65. As shown in the arrangement of FIG. 2 master brake cylinder 72 is connected in line 69 of the rear wheel brake circuit behind valve arrangement 78 and 79. The shape of the piston 73 now will enable the desired pressure ratio to be established with respect to the brake circuits of the front wheels. Line 69 now leads into the pressure chamber 75 and acts on piston 73 which will compress the brake fluid in pressure chamber 74. It is self-evident that in this way a hydraulic brake cylinder can be coordinated with each rear wheel 64 and 65, respectively, each of said brake cylinders communicating with the lines 6 and 19 via a control device. Thus, the existing system could be expanded to a four-circuit brake system wherein the brake circuits 70 and 71 would be independent of each other. Hence, a separate control of the rear wheels would become possible.

Figure 3:
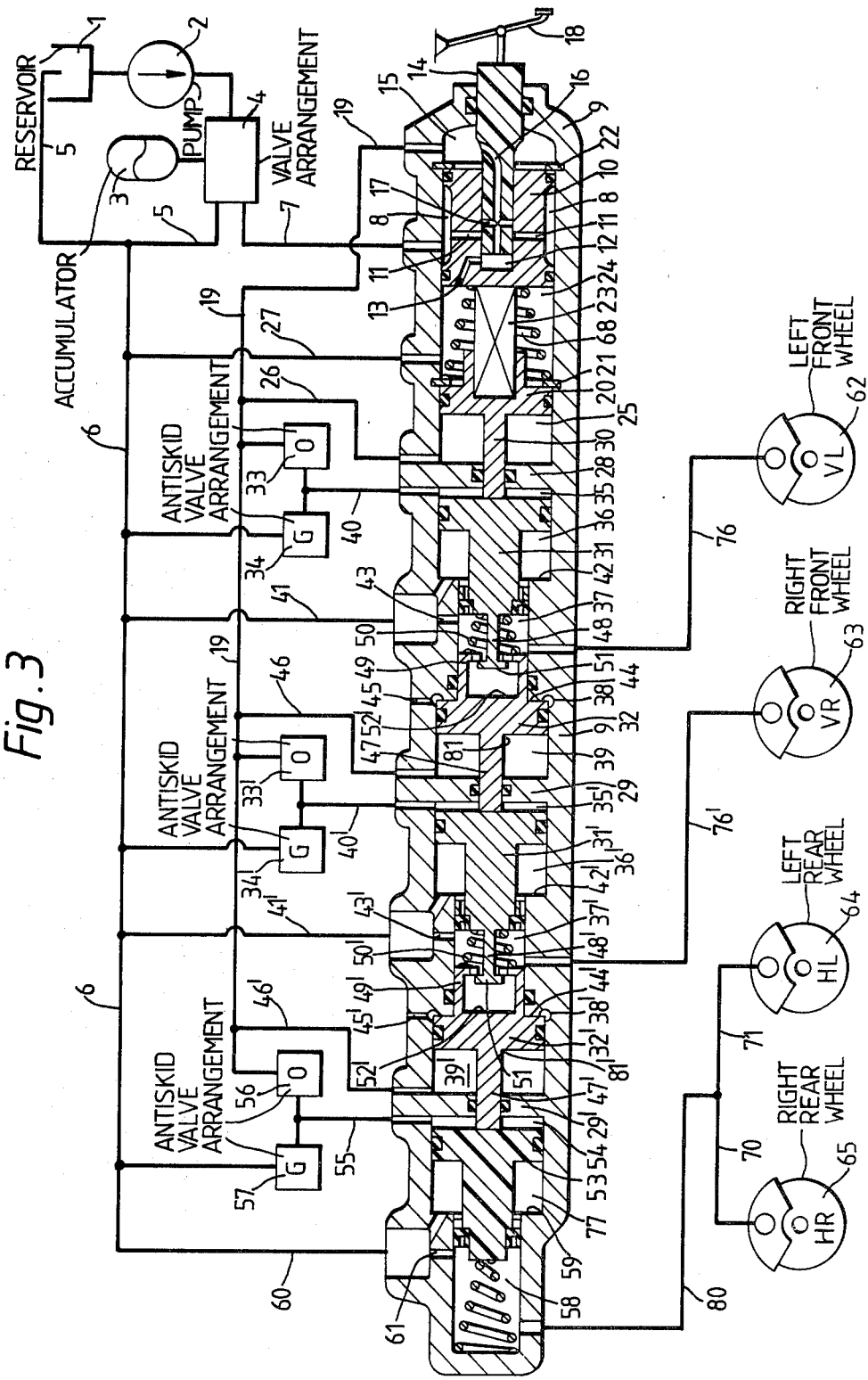
FIG. 3 is a longitudual cross sectional view of a three-circuit master brake cylinder in accordance with the principles of the present invention.

Of course, it is also possible to arrange the additionally provided brake cylinder 72 of FIG. 2 in a coaxial manner with respect to the tandem master cylinder of FIG. 1 Thus, a three-circuit master cylinder is provided as illustrated in FIG. 3. The structure of this master cylinder differs from that represented in FIG. 1 only in that a further section II has been inserted in housing 9. Since the elements of the added section exactly correspond to the section II in FIG. 1, all reference numerals have been given an apostrophe. What is noticeable in this arrangement is that now, upon failure of the hydraulic pressure unit, all the brake circuits may be actuated by brake pedal 18 in a hydraulic or mechanical manner. Thus, two energy systems would be possible for a brake actuation system which are to be used independently of each other:—the hydraulic pressure system provided by the vehicle, on the one hand, and the pedal force provided by the driver, on the other hand.

It should be pointed out in particular that in case of connecting a plurality of structural units behind one another it will be necessary to safeguard the operational play of the individual elements amongst one another, the mechanical/hydraulic force transmission being ensured until the last piston of the last brake system and the feed lines that lead to the brake circuits are not shut off.

A total separation of the individual brake circuits from the hydraulic pressure medium circuit can be achieved by providing each brake circuit with a compensation reservoir 66 (FIG. 2) of its own.

While we have described above the principles of our invention in connection with specific apparatus it is to be clearly understood that this description is made by way of example and not as a limitation to the scope of our invention as set forth in the objects thereof and in the accompanying claims.

We claim:

1. A hydraulic brake actuation device for motor vehicles equipped with an antiskid system comprising at least:
    a continuous-delivery pressure medium source;
    a pressure medium circuit controllably connected to said source by a pedal-operated control device;
    a first master cylinder connected to a first brake circuit and said pressure medium circuit by a first antiskid valve arrangement, said first brake circuit being independent of said pressure medium circuit, a first master cylinder piston disposed in said first master cylinder being operable by at least one of the pressure in said pressure medium circuit and a brake pedal; and
    a second master cylinder connected to said first master cylinder, said second master being connected to a second brake circuit and said pressure medium circuit by a second antiskid valve arrangement, said second brake circuit being independent of said pressure medium circuit, a second master cylinder piston disposed in said second master cylinder, being operable by the pressure in said pressure medium circuit and, in case of disturbances in said pressure medium circuit, by the pressure in said first brake circuit by way of a mechanical means.

2. A device according to claim 1, wherein;
    said control device, said first master cylinder piston, said mechanical means and said second master cylinder piston are disposed coaxially in tandem in the order named.

3. A device according to claim 2, wherein;
    said mechanical means is also mechanically operable by said first master cylinder piston.

4. A device according to claim 1, 2 or 3 wherein;
    said mechanical means includes:
        a stepped piston slideable in a first pressure chamber disposed between said first and second master cylinders, the smaller diameter portion of said stepped piston projecting into a second pressure chamber disposed in said second master cylinders and the large diameter portion of said stepped piston having a first transverse surface defining a third pressure chamber disposed in said first brake circuit, a second transverse surface of the larger diameter portion of said stepped piston spaced from said first transverse surface being acted upon by the pressure in said pressure medium circuit to keep said first transverse surface against a shoulder formed in a housing of said first master cylinder.

5. A device according to claim 4, wherein;
said stepped piston further includes:
- a portion extending from said first transverse surface in a slideably sealed relation with the walls of said third pressure chamber, said portion having a diameter smaller than the diameter of the larger diameter portion of said stepped piston and the surface of said second transverse surface is equal to or larger than the surface acted upon by pressure in said third pressure chamber.

6. A device according to claim 5, wherein;
said first master cylinder piston communicates with said stepped piston via a backlash coupling, and
a preloaded spring is disposed between said first master cylinder piston and said stepped piston.

7. A device according to claim 4, wherein;
said first master cylinder piston communicates with said stepped piston via a backlash coupling, and
a preloaded spring is disposed between said first master cylinder piston and said stepped piston.

8. A device according to claim 1, wherein;
said first master cylinder and said mechanical means are a single structural unit.

9. A device according to claim 1, wherein;
each of said first and second brake circuits is connected to a different front wheel brake cylinder.

10. A device according to claim 1, further including:
a third antiskid valve arrangement connected between said pressure medium circuit and both rear wheel brake cylinders.

11. A device according to claim 1, further including:
a third antiskid valve arrangement connected to said pressure medium circuit; and
a third master cylinder connected between said third valve arrangement and both rear wheel brake cylinders.

12. A device according to claim 11, wherein;
said third master cylinder is disposed coaxially in tandem with said second master cylinder.

13. A device according to claim 12, wherein;
said second master cylinder piston can mechanically or hydraulically actuate a third master cylinder piston disposed in said third master cylinder through an additional mechanical means in case of disturbances in said pressure medium circuit.

* * * * *